United States Patent
Lee

(10) Patent No.: US 8,350,924 B2
(45) Date of Patent: Jan. 8, 2013

(54) SYSTEM AND METHOD FOR PROCESSING IMAGE SIGNALS BASED ON INTERPOLATION

(75) Inventor: Jung won Lee, Seoul (KR)

(73) Assignee: Semisolution Inc., Seongnam (KR)

( * ) Notice: Subject to any disclaimer, the term of this patent is extended or adjusted under 35 U.S.C. 154(b) by 157 days.

(21) Appl. No.: 12/866,809

(22) PCT Filed: Feb. 13, 2009

(86) PCT No.: PCT/KR2009/000721
§ 371 (c)(1),
(2), (4) Date: Aug. 9, 2010

(87) PCT Pub. No.: WO2009/102174
PCT Pub. Date: Aug. 20, 2009

(65) Prior Publication Data
US 2010/0315530 A1 Dec. 16, 2010

(30) Foreign Application Priority Data
Feb. 15, 2008 (KR) .................. 10-2008-0013766

(51) Int. Cl.
*H04N 9/73* (2006.01)
(52) U.S. Cl. ........... 348/223.1; 348/229.1; 348/279; 348/280; 348/222.1; 382/162; 382/167; 345/600; 345/603; 345/604; 345/605
(58) Field of Classification Search .......... 348/223.1, 348/231.99, 279–280
See application file for complete search history.

(56) References Cited

U.S. PATENT DOCUMENTS

| 7,042,465 | B2 * | 5/2006 | Shiohara | 345/604 |
| 2002/0135683 | A1 * | 9/2002 | Tamama et al. | 348/222 |
| 2002/0145610 | A1 * | 10/2002 | Barilovits et al. | 345/538 |
| 2005/0099430 | A1 * | 5/2005 | Akiyama et al. | 345/600 |
| 2005/0238225 | A1 | 10/2005 | Jo et al. | 382/162 |
| 2005/0285952 | A1 * | 12/2005 | Kwon et al. | 348/234 |
| 2006/0092440 | A1 * | 5/2006 | Bagai | 358/1.9 |
| 2006/0176314 | A1 * | 8/2006 | Shiohara | 345/604 |

(Continued)

OTHER PUBLICATIONS

PCT International Search Report dated Jun. 12, 2009 issued in Application No. PCT/KR2009/000721.

*Primary Examiner* — Jason Chan
*Assistant Examiner* — Cynthia Segura
(74) *Attorney, Agent, or Firm* — KED & Associates, LLP

(57) ABSTRACT

There is provided a method for performing digital processing on an image signal output from CCD image sensors with a CMYG color filter array, the method including converting a digital CMYG signal of 10 bits each into a first YCbCr signal of 10 bits each, by using color interpolation, converting the first YCbCr signal of 10 bits each into an RGB signal of 8 bits each by using interpolation, performing color correction on the RGB signal of 8 bits each and converting a color-corrected RGB signal of 8 bits each into a second YCbCr signal of 8 bits each in a format which complies with the ITU-601 format, encoding the second YCbCr signal of 8 bits each and converting an encoded second YCbr signal of 8 bits each into an analog video signal, and adjusting automatic exposure and automatic white balance, using the RGB signal of 8 bits each and the second YCbCr signal of 8 bits each.

15 Claims, 3 Drawing Sheets

U.S. PATENT DOCUMENTS

2007/0216705 A1* 9/2007 Shiohara .................. 345/604
2008/0198174 A1* 8/2008 Shiohara .................. 345/604
2008/0284793 A1* 11/2008 Young ..................... 345/604
2009/0060380 A1* 3/2009 Bujold et al. ............. 382/275
2009/0268963 A1* 10/2009 Kang et al. ............... 382/168
2009/0322777 A1* 12/2009 Lu et al. .................. 345/582

* cited by examiner

Mode 0: REG <--> YCbCr:
  RGB range:16~235
  Y range:16~235, Cb and Cr range:16~240 (ITU-601 standard)

Y=(77/256)*R+(150/256)*G+(29/256)*B  =0.299R+0.587G+0.114B
  Cb=-(44/256)*R-(87/256)*G+(131/256)*B+128=-0.172R-0.339G+0.511B+128
  Cr=(131/256)*R-(110/256)*G-(21/256)*B+128=0.511R-0.428G-0.038B+128

Mode 1: REG <--> YCbCr:
  RGB range:0~255
  Y range:16~235, Cb and Cr range:16~240 (ITU-601 standard)

Y= 0.257R+0.504G+0.098B+16=(66/256)R+(129/256)G+(25/256)B=0.257R+0.503G
     +0.097B
  Cb=-0.148R-0.291G+0.439B+128=-(38/256)R-(74/256)G+(112/256)B+128=0148R+
     0.289G+0.437b+128
  Cr=0.439R-0.368G-0.071B+128=(111/256)R+(94/256)G+(18/256)B+128=0.437R+
     0.367G+0.07B+128

SYSTEM AND METHOD FOR PROCESSING IMAGE SIGNALS BASED ON INTERPOLATION

TECHNICAL FIELD

The present invention relates to a method for performing digital processing on an image signal output from CCD image sensors.

BACKGROUND ART

Generally, a digital camera or camcorder uses CCD (Charge Coupled Device) image sensors or CMOS image devices, instead of a film. The CCD image sensors include photosensitive elements and a color filter array provided on the photosensitive elements. The photosensitive elements detect only luminance of a captured image. So, the color filter array has to be provided on the photosensitive elements to obtain luminance and color values to represent the captured image.

There are largely two kinds of color filters. One is a primary-color filter including the RGB color filter, and the other is a complementary-color filter including the CMYG color filter.

A CMYG color filter array accurately detects color of the captured image more accurately than a RGB color array. So, the CMYG color filter array is in wide use for the camcorder.

A DSP (digital signal processor) board in image-processing apparatus for CCTV (Closed-circuit television) performs digital image processing, including color interpolation, gamma correction, automatic exposure and automatic white balance, on the image captured by a CCD camera. After the image processing is done, the captured image is reproduced on a screen.

The CCD camera in the image-processing apparatus includes the CCD image sensors having the CMYG color array which is available for the NTSC/PAL (National Television System Committee/Phase Alternating Line) system. An analog image signal output from the CCD image sensors is converted into a digital image signal by an A/D convertor.

As shown in FIG. 2, Cy, Ye, Mg, and G values obtained from the CMYG color filter array are stored in pixels in the capture image. The Cy, Ye, Mg, and G values are output as a signal in an interlaced scanning way of transferring the odd-numbered lines of the pixels in the captured image, followed by the even-numbered lines of the pixels in the captured image Modules of the DSP board are shown in FIG. 3, which perform digital image processing on the captured image.

The A/D convertor converts the analog image signal output from the CCD image sensors with the CMYG color array into an (Mg+Cy), (Ye+G), (Mg+Cy), and (Ye+G) signal of 10 bits each. As shown in FIG. 3, the (Mg+Cy), (Ye+G), (Mg+Cy), and (Ye+G) signal of 10 bits each is input into a defective-signal correction unit 1. The defective-signal correction unit 1 corrects a defective (Mg+Cy), (Ye+G), (Mg+Cy), and (Ye+G) signal. Thereafter, a luminance processing unit 2 and a color processing unit 3 extract a luminance Y signal and a Cb and Cr signal from the (Mg+Cy), (Ye+G), (Mg+Cy), and (Ye+G) signal, respectively. Thereafter, gamma-correction units 4 and 5 perform gamma-correction processing on the luminance Y signal and the Cb and Cr signal which are output from the luminance processing unit 2 and the color processing unit 3. Thereafter, an encoding unit 6 encodes the luminance Y signal and the Cb and Cr signal in the NTSC/PAL format. Last, a DAC converts the encoded signal into an analog signal.

A timing signal generation unit 8 generates a driving signal of adjusting a timing of an electric shutter, depending upon amplitude of the luminance Y signal. The driving signal is sent to the CCD image sensors. An interface unit 9 has an inter-integrated circuit for outside connection.

An AE/AWB adjustment unit 7 adjusts automatic exposure (AE) for luminance and automatic white balance (AWB) for color, using the Cb and Cr signal.

The automatic white balance is adjusted by changing the Cb and Cr values. In a conventional method, the Cb and Cr value has to be set to 128, when each of the Cb and Cr signal is in 8 bits. That is, the automatic white balance is properly adjusted by increasing the Cb and Cr value when it is less than 128, and by decreasing the Cb and Cr value when it is greater than 128.

The automatic exposure is adjusted by changing the luminance Y value. That is, the automatic exposure is adjusted by making the luminance Y value closer to a target value.

DISCLOSURE OF INVENTION

Technical Problem

In the conventional method, the automatic exposure and the automatic white balance are adjusted using the Cb and Cr values. As a result, the automatic exposure and the automatic white balance cannot properly be adjusted when the luminance Y value is too high or too low, or when a difference between R, G, and B values is too great. This causes color-image noise and poor resolution.

Technical Solution

Therefore, an object of the present invention is to perform digital image processing on an RGB signal which are converted from a YCbCr signal.

Another object of the present invention is to adjust automatic exposure and automatic white balance using both an RGB signal and a YCbCr signal.

Another object of the present invention is to convert an RGB signal back to an YCbCr signal in the ITU-601 format for general purpose.

According to an aspect of the present invention, there is provided a method for performing digital processing on an image signal output from CCD image sensors with a CMYG color filter array, the method including converting a digital CMYG signal of 10 bits each into a first YCbCr signal of 10 bits each, by using color interpolation, converting the first YCbCr signal of 10 bits each into a RGB signal of 8 bits each by using interpolation, performing color correction on the RGB signal of 8 bits each and converting a color-corrected RGB signal of 8 bits each into a second YCbCr signal of 8 bits each in a format which complies with the ITU-601 format, encoding the second YCbCr signal of 8 bits each and converting an encoded second YCbCr signal of 8 bits each into an analog video signal, and adjusting automatic exposure and automatic white balance, using the RGB signal of 8 bits each and the second YCbCr signal of 8 bits each.

The adjusting of the automatic white balance may include receiving the RGB signal of 8 bits each and the second YCbCr signal of 8 bits each, selecting a corresponding RGB signal when a Y value is in a target range, selecting corresponding a RGB signal when a difference between Cb and Cr values is in a target range and making the R, G, and B values converge on average R, G, and B values which are calculated by averaging R, G, and B values of the selected RGB signal, respectively.

The automatic white balance may be adjusted by increasing the R, G, and B values when the R, G, and B values are less than the average R, G, and B values of the selected RGB signal, respectively and by decreasing the R, G, and B values when the R, G, and B values are greater than the average R, G, and B values of selected RGB signal, respectively.

The adjusting of the automatic exposure may include receiving the RGB signal of 8 bits each and the second YCbCr signal of 8 bits each, selecting the corresponding Y signal when the RGB values are in a target range and adjusting a Y value of the selected Y signal to a target value.

The automatic exposure may be adjusted by increasing a Y value when it is less than the target value and by decreasing a Y value when it is greater than the target value.

According to the present invention, digital image processing is performed on the RGB signal of 8 bits each which is converted from the first YCbCr signal of 10 bits each, using interpolation. This results in improving the color image quality.

Furthermore, use of both the RGB signal of 8 bits each and the YCbCr signal converted from the RGB signal of 8 bits each makes it possible to improve the efficiency of the digital image processing and to enable easy adjustment of the automatic exposure and the automatic white balance.

The RGB signal can be converted back into the YCbCr signal in the ITU-601 format for general purpose.

MODE FOR THE INVENTION

Description will now be given in detail of the preferred embodiments of the present invention, examples of which are illustrated in the accompanying drawings.

A DSP (digital signal processor) board in image-processing apparatus for CCTV (Closed-circuit television) performs digital image processing, including color interpolation, gamma correction, automatic exposure and automatic white balance, on the image captured by a CCD camera. After the image processing is done, the captured image is reproduced on a screen.

The CCD camera in the image-processing apparatus includes the CCD image sensors having the CMYG color array which is available for the NTSC/PAL (National Television System Committee/Phase Alternating Line) system. An analog image signal output from the CCD image sensors is converted into a digital image signal by an A/D converter. Cy, Ye, Mg, and G values obtained from the CMYG color filter array are stored in pixels in the capture image. The Cy, Ye, Mg, and G values are output as a signal in an interlaced scanning way of transferring the odd-numbered lines of the pixels in the captured image, followed by the even-numbered lines of the pixels in the captured image.

Figure 1:
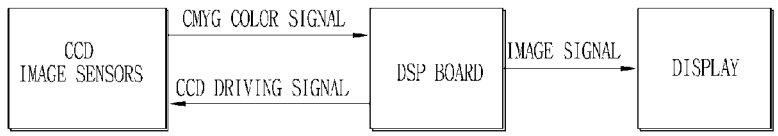
FIG. 1 is a block diagram of conventional image processing apparatus.
Figure 2:
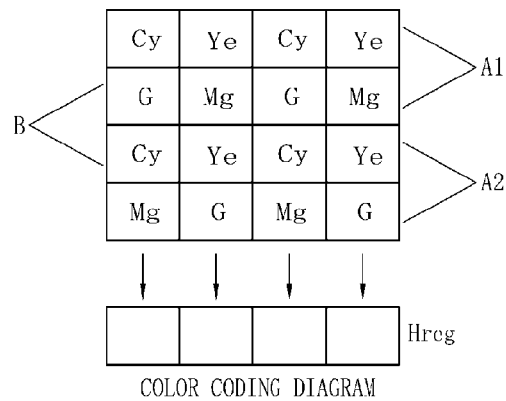
FIG. 2 is a color coding diagram which helps explain a conventional method for performing digital processing on an image signal output from CCD image sensors with a CMYG color array, using color interpolation.
Figure 3:
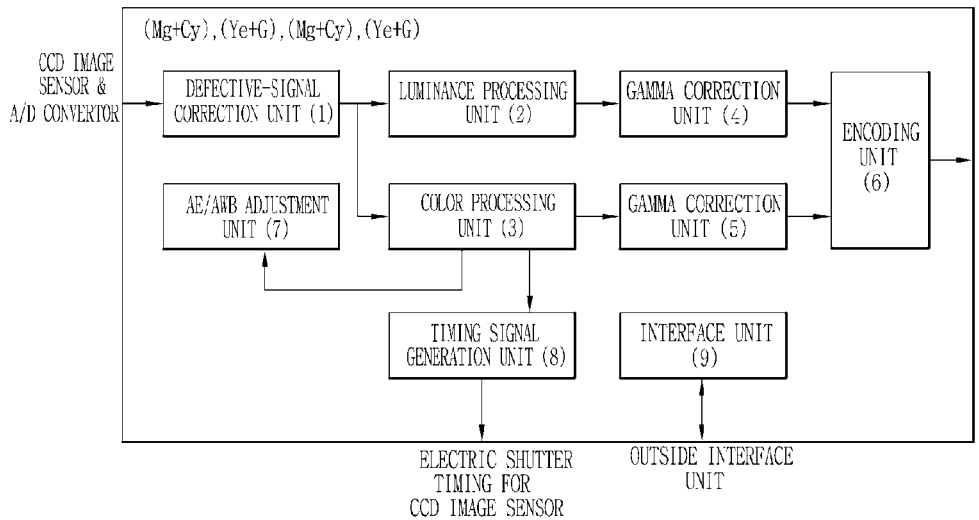
FIG. 3 is a block diagram of modules of a DSP board which perform digital processing according to the conventional method.
Figures 4, 5:
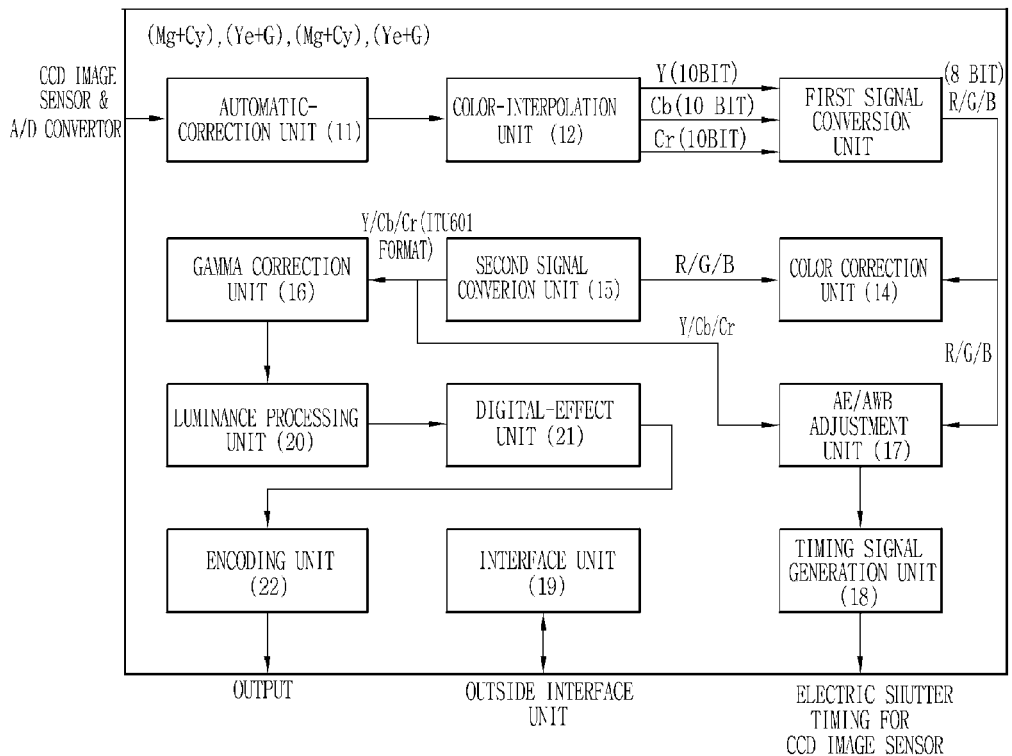
FIG. 4 is a block diagram of modules of a DSP board which perform digital processing according to the present invention.
FIG. 5 is a view illustrating that an RGB signal is converted into a YCbCr signal in the ITU-601 format.

FIG. 4 is a block diagram of modules of a DSP board which perform digital processing according to the present invention.

Referring to FIG. 4, the DSP board performs operations including gamma-correction, automatic exposure, and automatic white balance on a CMYG signal of 10 bits each into which the A/D converter converts the analog image signal output from the CCD image sensors. A timing signal generation unit 18 generates a vertical synchronization signal for 525HL/625HL, a signal to drive the CCD image sensors, an input signal for the A/D converter, and vertical and horizontal signals for the DSP.

The A/D converter converts the analog image signal output in a interlaced scanning manner from the CCD image sensors for CCTV into the (Mg+Cy), (Ye+G), (Mg+Cy), and (Ye+G) signal. The (Mg+Cy), (Ye+G), (Mg+Cy), and (Ye+G) signal is input into an automatic-correction unit 11. The automatic-correction unit 11 corrects a defective (Mg+Cy), (Ye+G), (Mg+Cy), and (Ye+G) signal for defective pixels in the captured image.

Thereafter, the (Mg+Cy), (Ye+G), (Mg+Cy), and (Ye+G) signal is input into a color-interpolation unit 12. The color-interpolation unit 12 converts the (Mg+Cy), (Ye+G), (Mg+Cy), and (Ye+G) signal into an YCbCr signal of 10 bits each by applying color interpolation. At this point, the color interpolation unit 12 temporarily stores the data in a memory for later use. The Y value is ((Mg+Ye)+(G+Cy)), the Cb value is ((Mg+Cy)−(G+Ye)), and Cr value is ((Mg+Ye)−(G+Cy)). The memory is necessary for increasing efficiency of color interpolation. (Mg+Ye) and (G+Cy) values are obtained by adopting data on neighboring pixels.

A first signal conversion unit 13 converts the YCbCr signal of 10 bits each into an RGB signal of 8 bits each. This is done by applying various interpolations including linear interpolation.

The RGB signal of 8 bit each are input into a color correction unit 14 and an AE/AWB adjustment unit 17, at the same time. Frequency of each color filter does not reflect human being's sensitivity to color. For this reason, the color correction unit 14 performs color correction on the RGB signal of 8 bits each to better express the color image. This is done by using a color matrix because the RGB color values may include other color.

A second signal conversion unit 15 converts a color-corrected RGB signal into a YCbCr signal in the IUT-601 format. A gamma correction unit 16 performs gamma correction on the YCbCr signal.

In FIG. 5, it is illustrated that the second signal conversion unit 15 converts the color-corrected RGB signal into the YCbCr signal in the ITU-601 format.

As shown in FIG. 5, Y value is defined to have a range of 16~235 and Cb and Cr value is defined to have a range of 16~240, in modes 0 and 1, in case of the RGB signal of 8 bits each. This is done to convert the color-corrected RGB signal into the YCbCr signal in the ITU-601 format.

A gamma correction unit 16 performs gamma correction on the YCbCr signal. A luminance processing unit 20 performs luminance roll-back operation of decreasing gains of bright areas and maintaining gains of dark areas for the gamma-corrected YCbCr signal. A digital-effect unit 21 performs image enhancement and adds an OSD (on-screen display) element on the image to display information such as volume, channel, and time. An encoding unit 22 encodes the YCbCr signal in the NTSC/PAL format. A DAC converts an encoded YCbCr signal into an analog video signal.

A timing signal generating unit 18 sends a driving signal to the CCD image sensors, and generates signals for adjusting Op Amp gains of the A/D and for driving the A/D. An interface unit 19 has an inter-integrated circuit for outside connection.

An AE/AWB adjustment unit 17 receives the RGB signal of 8 bits each from the first signal conversion unit 13 and the YCbCr signal of 8 bits each in the ITU format from the second signal conversions unit 15 at the same time. The RGB signal of 8 bits each and the YCbCr signal of 8 bits each are used for automatic exposure and automatic white balance.

Figure 6:
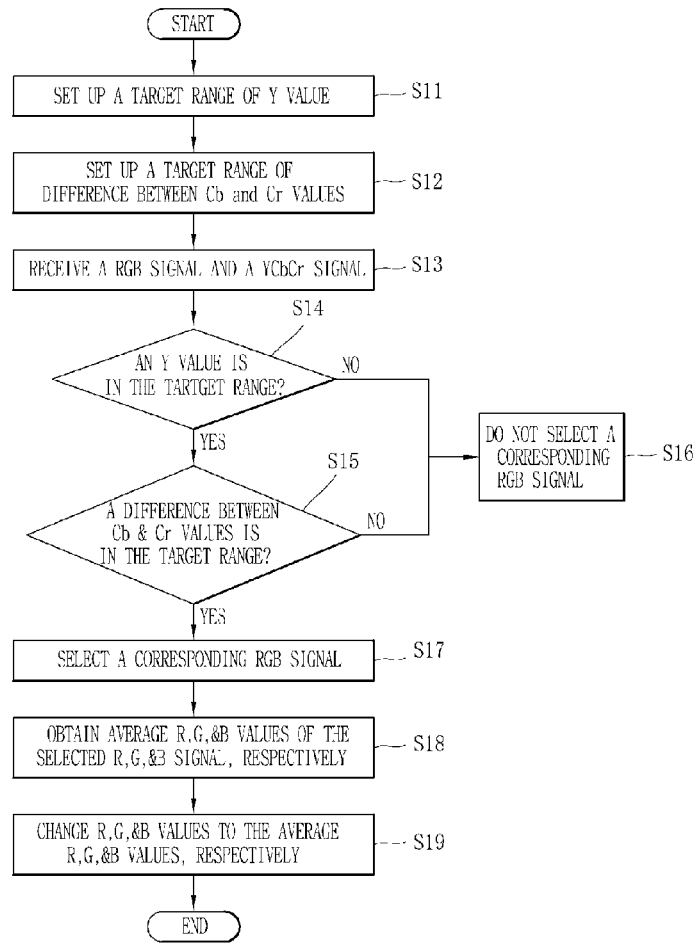
FIG. 6 is a flow chart illustrating steps of adjusting automatic white balance.
Figure 7:
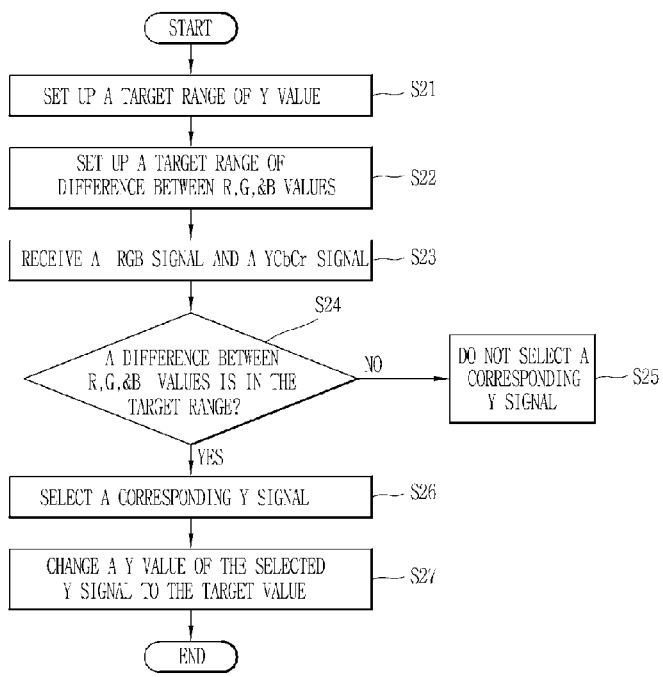
FIG. 7 is a flow chart illustrating steps of adjusting automatic exposure.

Referring to FIGS. 6 and 7, the adjusting of automatic exposure and automatic white balance is now described.

The CCD image sensors do not match the sensors in the human eye. For example, the human being always perceives a color of a white object as white, as it is. However, the color of the white object the CCD image sensors perceive varies, depending upon a frequency of a light source. The white balance adjustment unit enables the CCD image sensors to perceive a color of a white object as white, as it is, by adjusting gains of R/G/B.

The AE/AWB adjustment unit 17 selects an RGB signal, based on Y, Cb, and Cr values of the YCbCr signal in the ITU-601 format, to adjust automatic exposure and automatic white balance.

Referring to FIG. 6, the adjusting of automatic white balance is now described which the AE/AWB adjustment unit 17 performs. A target range of the Y value and a target range of difference between the Cb and Cr values are set up (S11 and S12). The RGB signal of 8 bits each and the second YGbCr signal of 8 bits each in the ITU-601 format are received from the first signal conversion unit 1 and the second signal conversions unit 13, respectively (S13).

It is determined if the Y value is in the target range or not (S14). A corresponding RGB signal is not selected when the Y value is not in the target range (S16). That is, the corresponding RGB signal is not selected when the Y value is too high or too low (for example, Y=255, or Y=0).

It is determined if the difference between the Cb and Cr values is in the target ranges or not (S15). A corresponding RGB signal isn't selected when the difference between the Cb and Cr values is not in the target range (S16). That is, a corresponding RGB signal is not selected when the difference between the Cb and Cr values is too high or too low.

A corresponding RGB signal is selected when the difference between the Cb and Cr values is in the target range (S17). R, G, and B values of the selected RGB signal are averaged to obtain average R, G, and B values, respectively (S18). R, G, and B values are increased or decreased to the average R, G, and B values, respectively (S19).

Automatic exposure enables an optimum dynamic range of light by adjusting exposure time and gain depending upon ambient light levels.

The AE/AWB adjustment 17 receives the Y signal, based on both the YCbCr signal in the ITU-601 format and the RGB signal, to adjust the automatic exposure.

Referring to FIG. 7, the adjusting of the automatic exposure is described which the AE/AWB adjustment unit 17 performs. A target value of Y and target ranges of the RGB values are set up (S21 and S22). The RGB signal and the YCbCr signal in the ITU-601 format are received from the first signal conversion unit 13 and the second signal conversion unit 15, respectively (S23).

It is determined if a difference between R, G, and B values is in the target ranges, respectively (24). A corresponding Y signal is not selected when the difference between R, G, and B values are not in the target range (S25). That is, the corresponding RGB signal is not selected when the difference between R, G, and B values is too high, or too low. (for example, when R is 255, G is 0, and B is 0)

A corresponding Y signal is selected when the difference between R, G, and B values is in the target ranges (S26). The Y value of the Y signal is increased or decreased to the target Y value, when it is less than or greater than the target Y value, respectively (27).

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for processing image signals comprising:
   converting a digital CMYG signal of 10 bits each into a first YCbCr signal of 10 bits each, by using color interpolation;
   converting the first YCbCr signal of 10 bits each into a RGB signal of 8 bits each by using interpolation;
   performing color correction on the RGB signal of 8 bits each and converting a color-corrected RGB signal of 8 bits each into a second YCbCr signal of 8 bits each in a format which corresponds to a ITU-601 format;
   encoding the second YCbCr signal of 8 bits each and converting the encoded second YCbCr signal of 8 bits each into an analog video signal; and
   adjusting automatic exposure and automatic white balance based on the RGB signal of 8 bits each and the second YCbCr signal of 8 bits each.

2. The method according to claim 1, wherein the adjusting of the automatic white balance comprises:
   receiving the RGB signal of 8 bits each and the second YCbCr signal of 8 bits each;
   selecting a corresponding RGB signal when a Y value is in a target range;
   selecting a corresponding RGB signal when a difference between Cb and Cr values is in a target range; and
   making the R, G, and B values converge on average R, G, and B values which are calculated by averaging R, G, and B values of the selected RGB signal, respectively.

3. The method according to claim 2, wherein the automatic white balance is adjusted by increasing the R, G, and B values when the R, G, and B values are less than the average R, G, and B values of the selected RGB signal, respectively and by decreasing the R, G, and B values when the R, G, and B values are greater than the average R, G, and B values of the selected RGB signal, respectively.

4. The method according to claim 1, wherein the adjusting of the automatic exposure comprises:
   receiving the RGB signal of 8 bits each and the second YCbCr signal of 8 bits each;
   selecting a corresponding Y signal when the RGB values are in a target range; and
   adjusting a Y value of the selected Y signal to a target value.

5. The method according to claim 4, wherein the automatic exposure is adjusted by increasing a Y value when the Y value is less than the target value and by decreasing the Y value and when the Y value is greater than the target value.

6. A method for processing image signals comprising:
   converting a digital CMYG signal of a first number of bits each into a first YCbCr signal of the first number of bits each, based on color interpolation;
   converting the first YCbCr signal of the first number of bits each into a RGB signal of a second number of bits based on interpolation;
   performing color correction on the RGB signal of the second number of bits each;

converting a color-corrected RGB signal of the second number of bits each into a second YCbCr signal of the second number of bits each;

encoding the second YCbCr signal of the second number of bits each;

converting the encoded second YCbCr signal of the second number of bits each into an analog video signal; and adjusting at least one of automatic exposure or automatic white balance based on the RGB signal of the second number of bits each and the second YCbCr signal of the second number of bits each.

7. The method according to claim 6, wherein the first number of bits is greater than the second number of bits.

8. The method according to claim 7, wherein the first number of bits is 10 and the second number of bits is 8.

9. The method according to claim 6, wherein adjusting the automatic white balance comprises:
receiving the RGB signal of the second number of bits each and the second YCbCr signal of the second number of bits each;
selecting a corresponding RGB signal when a Y value is in a target range;
selecting a corresponding RGB signal when a difference between Cb and Cr values is in a target range; and
converging the R, G, and B values on average ones of the R, G, and B values.

10. The method according to claim 6, wherein adjusting the automatic exposure comprises:
receiving the RGB signal of the second number of bits each and the second YCbCr signal of the second number of bits each;
selecting a corresponding Y signal when the RGB values are in a target range; and
adjusting a Y value of the selected Y signal to a target value.

11. An apparatus for processing image signals comprising:
an input coupled to an image sensor, said input to receive a digital CMYG signal of a first number of bits; and
a processor to:
a) convert the digital CMYG signal of the first number of bits each into a first YCbCr signal of the first number of bits each based on color interpolation,
b) convert the first YCbCr signal of the first number of bits each into a RGB signal of a second number of bits based on interpolation,
c) perform color correction on the RGB signal of the second number of bits each,
d) convert a color-corrected RGB signal of the second number of bits each into a second YCbCr signal of the second number of bits each; and
e) encode the second YCbCr signal of the second number of bits each;
f) convert the encoded second YCbCr signal of the second number of bits each into an analog video signal; and
g) adjust at least one of automatic exposure or automatic white balance based on the RGB signal of the second number of bits each and the second YCbCr signal of the second number of bits each.

12. The apparatus according to claim 11, wherein the first number of bits is greater than the second number of bits.

13. The apparatus according to claim 12, wherein the first number of bits is 10 and the second number of bits is 8.

14. The apparatus according to claim 11, wherein the processor adjusts the automatic white balance by:
receiving the RGB signal of the second number of bits each and the second YCbCr signal of the second number of bits each;
selecting a corresponding RGB signal when a Y value is in a target range;
selecting a corresponding RGB signal when a difference between Cb and Cr values is in a target range; and
converging the R, G, and B values on average ones of the R, G, and B values.

15. The apparatus according to claim 11, wherein the processor adjusts the automatic exposure by:
receiving the RGB signal of the second number of bits each and the second YCbCr signal of the second number of bits each;
selecting a corresponding Y signal when the RGB values are in a target range; and
adjusting a Y value of the selected Y signal to a target value.

* * * * *